United States Patent
Kojima et al.

Patent Number: 5,984,318
Date of Patent: Nov. 16, 1999

[54] GASKET HOLDER

[75] Inventors: Akihiro Kojima; Tatsuhito Aoyama, both of Komaki, Japan

[73] Assignee: CKD Corporation, Japan

[21] Appl. No.: 08/881,115

[22] Filed: Jun. 24, 1997

[30] Foreign Application Priority Data

Jul. 16, 1996 [JP] Japan .................................. 8-186110

[51] Int. Cl.⁶ .......................................... F16J 15/02
[52] U.S. Cl. ................................ 277/616; 277/637
[58] Field of Search .......................... 277/616, 637

[56] References Cited

U.S. PATENT DOCUMENTS 4,077,389  3/1978  Vogel .................................. 277/637 X

FOREIGN PATENT DOCUMENTS 6-241400   8/1994  Japan .
7-269732  10/1995  Japan .

*Primary Examiner*—Anthony Knight
*Assistant Examiner*—Karlena D. Schwing
*Attorney, Agent, or Firm*—Finnegan, Henderson, Farabow, Garrett, & Dunner, LLP

[57] ABSTRACT

To provide a gasket holder facilitating attachment and detachment of the gasket holder and capable of preventing positional shift and detachment of a gasket, a first gasket holding portion formed in a straight line and a second gasket holding portion formed in a curved line are provided to a gasket retainer, a gasket is held by three point support of a recess of the first gasket holding portion and recesses and of the second gasket holding portion, and bending portions and of the gasket retainer are bent and are held by stopper holes of a flow rate control valve block.

14 Claims, 12 Drawing Sheets

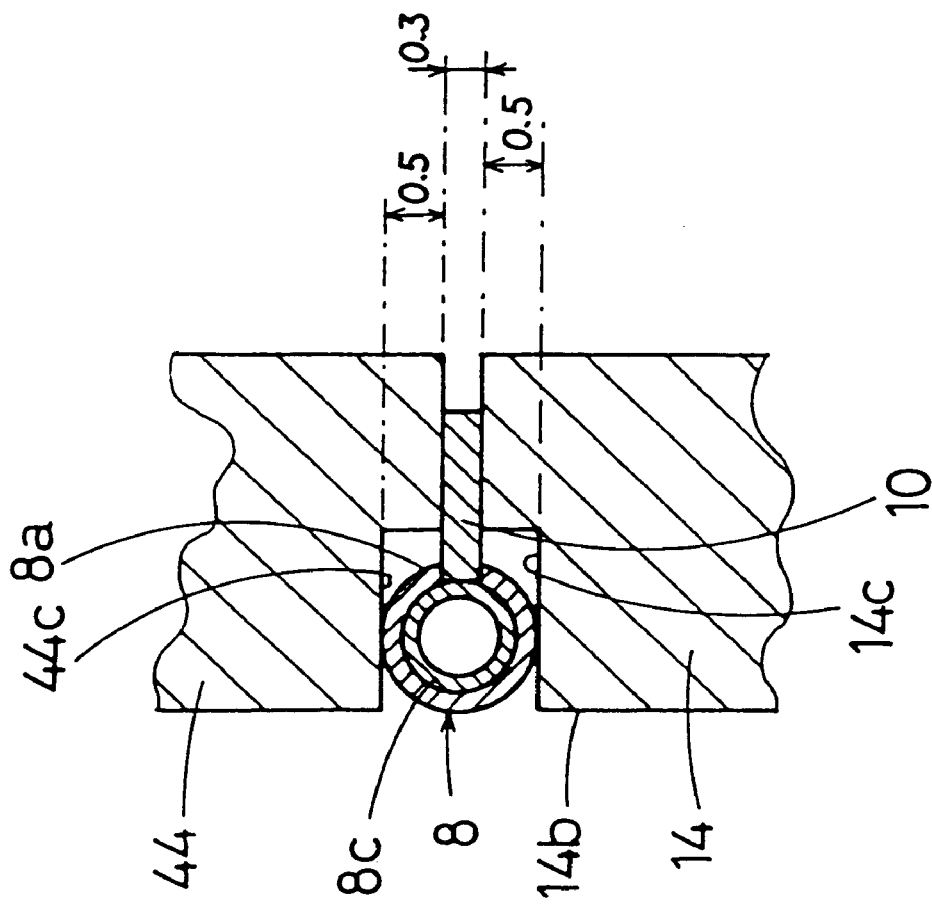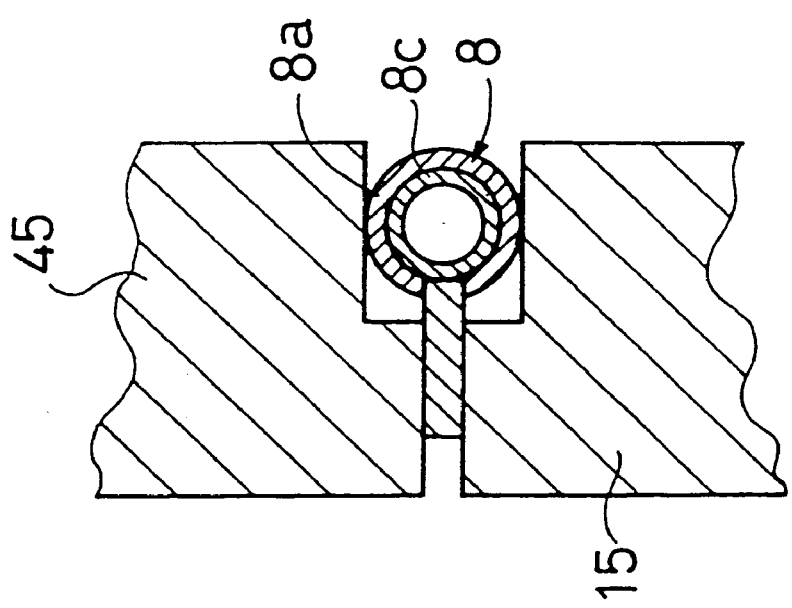

F I G. 1 4 (a)
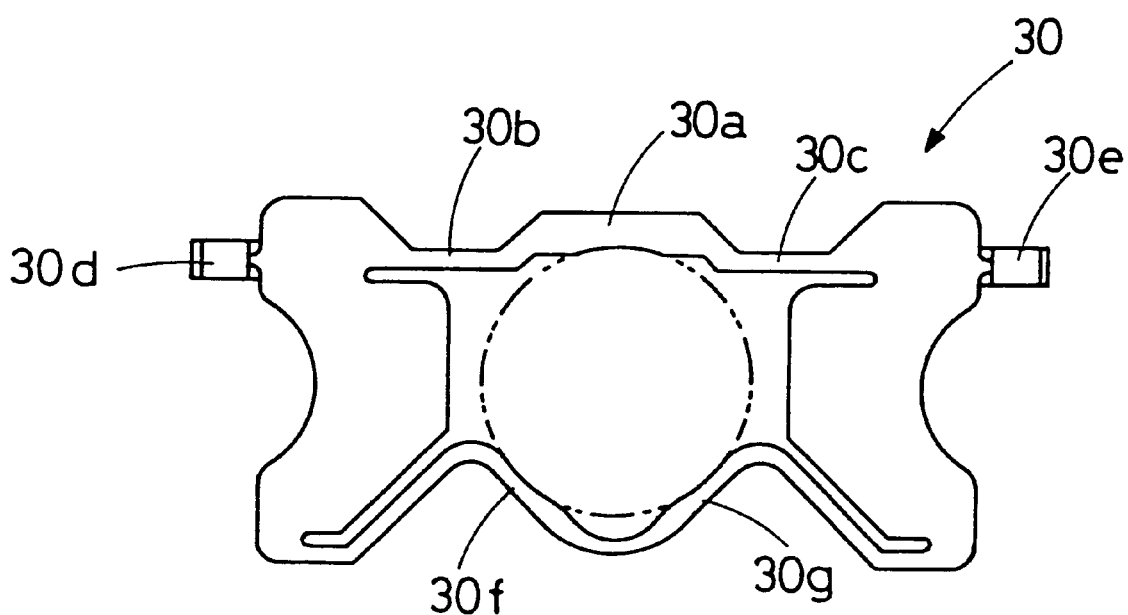
F I G. 1 4 (b)
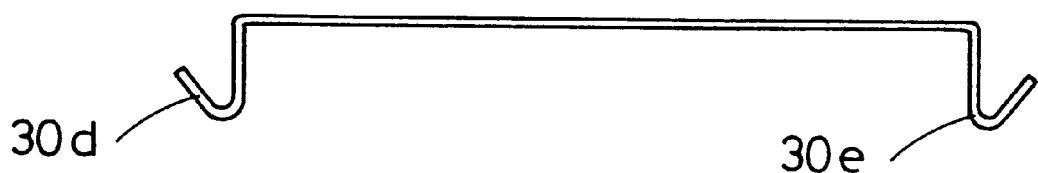

FIG. 16　　　　　　　　　　　　　　　　PRIOR ART
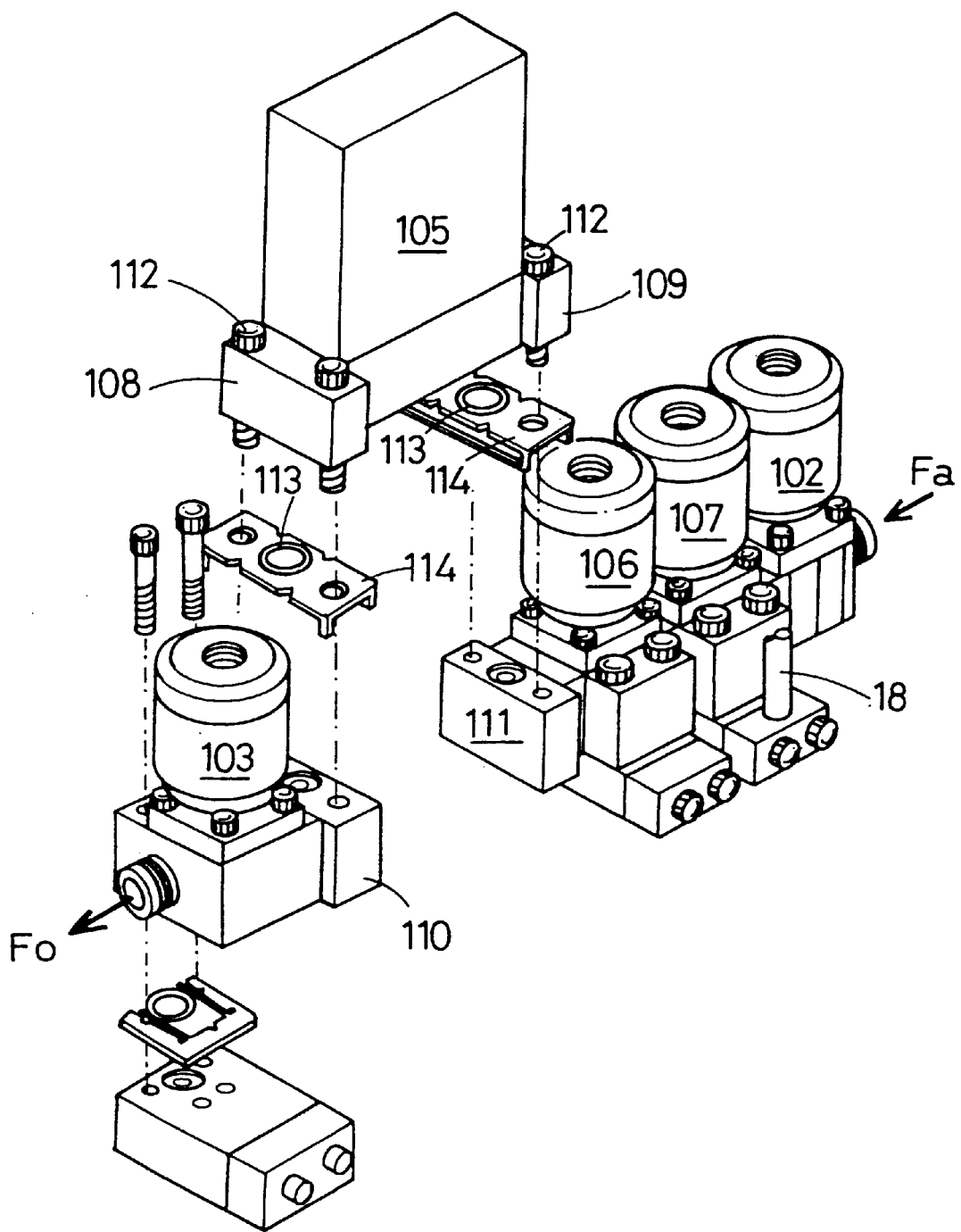

GASKET HOLDER

BACKGROUND OF THE INVENTION

1. Field of the Invention

The present invention relates to a gasket holder, particularly to a gasket holder suitable for using in gas supply devices used in industrial manufacturing devices such as semiconductor manufacturing devices.

2. Description of Related Art

There have been conventionally used corrosive gases in etching or the like of photoresist fabrication in semiconductor manufacturing steps. Photoresist fabrication (photoresist coating, exposure, development, etching) is repeated at plural times in semiconductor manufacturing steps and therefore, gas supply devices for supplying corrosive gases as necessary are used in actual semiconductor manufacturing steps.

Meanwhile, in manufacturing steps of semiconductors in recent years, it is necessary to supply small amounts of corrosive gases or the like with an accuracy of 1% or less in respect of a flow rate and the requirement of accuracy becomes severer. Therefore, control valves having high accuracy and high response are widely used also in corrosive gas supply devices in semiconductor manufacturing devices. In such a flow rate control valve having high accuracy, slender pipes are used and accordingly, it is difficult to completely exclude corrosive gases remaining in the pipes.

However, when corrosive gases remain in pipes at the inside of the flow rate control valve, the inside of the pipe is corroded by the remaining corrosive gases, accuracy of a flow rate mass sensor is deteriorated and corrosive gases cannot be supplied with high accuracy which causes to significantly deteriorate the yield in semiconductor manufacturing steps.

Further, if the pipe is left with the remaining corrosive gas after once supplying the corrosive gas until next supply of the corrosive gas, metals or the like at the inside of the pipe is corroded by the remaining corrosive gas and when the corrosive gas is successively supplied, impurities such as particles or the like are mixed in the corrosive gas which adversely effect on semiconductor products.

Hence, the applicants devised a gas supply device disclosed in JP-A-6-241400 in order to solve the above-described problem. According to the gas supply device, as shown by FIG. 16, an input valve 102 and an output valve 103 for cutting off flow of a corrosive gas Fa, a flow rate control valve 105 for controlling the flow rate of the corrosive gas Fa at an intermediary between the input and output valves, a purge valve 106 for supplying a replacement gas to the flow rate control valve 105 and an ejector valve 107 connected to an ejector, not illustrated, for reducing pressure of the corrosive gas Fa inside of the flow rate control valve 105, are unitized, and the flow rate control valve 105 is fastened to direction change blocks 110 and 111 from above by screws 112 via flow rate control valve blocks 108 and 109. Here, gaskets 113 and gasket retainers 114 are used respectively between the flow rate control valve blocks 108 and 109 and the direction change blocks 110 and 111 for preventing leakage of the corrosive gas Fa. According to the gasket retainer 114, legs are formed by bending downwardly both ends thereof in the longitudinal direction and the gasket retainer 114 is fixed to the direction change block 110 or 111 by pinching the outer sides thereof by the couple of legs.

The corrosive gas Fa can be removed efficiently by constituting the gas supply device as described above and further, the flow rate control valve 105 can be integrated with the gas supply device from above while maintaining a gas tight state.

However, there are following problems in the above-described gas supply device.

(1) Positioning of the gasket retainers 114 is conducted by attachment bolts attached to the direction change blocks 110 and 111 and therefore, the gaskets 113 may not be accurately positioned to through holes. Further, the gaskets 113 are liable to shift from or detach from the direction change blocks 110 and 111.

(2) The gaskets 113 are held by the gasket retainers 114 by two point support and therefore, the gaskets 113 are liable to detach from the gasket retainers 114.

The present invention resolves the above-described problems and it is an object of the present invention to provide a gasket holder facilitating attachment and detachment of the gasket holder, capable of preventing positional shift and detachment of the gasket holder in attaching and detaching a flow rate control valve and preventing a gasket from detaching from the gasket holder.

SUMMARY OF THE INVENTION

In order to achieve the object, according to a first aspect of the present invention, there is provided a gasket holder for holding a gasket used as a seal member for a base block where a first hole for passing a fluid is formed and an attachable and detachable block which is attachably and detachably mounted to the base block and where a second hole for passing the fluid is formed in integrating the attachable and detachable block to the base block by positioning the first hole to the second hole, said gasket holder including gasket holding portions for holding the gasket at a predetermined position by pinching from an outer side an opening of the gasket which is of annular shape includes an outer sheath having an outside circumferential slot and an inner circumferential coil spring core, and stopper portions stopped by the attachable and detachable block.

By this constitution the gasket is held by the gasket holding portions of the gasket holder and the gasket holder is stopped to the attachable and detachable block by the stopper portions whereby the gasket holder is prevented from detaching from the attachable and detachable block.

According to a second aspect of the present invention, there is provided the gasket holder according to the first aspect wherein the gasket holding portion holds the gasket by three point support or four point support.

By this constitution, the gasket is firmly held by the gasket holding portion and is difficult to detach from the gasket holder.

According to a third aspect of the present invention, there is provided the gasket holder according to the first aspect wherein stopper holes for inserting the stopper portions are provided to the attachable and detachable block and the stopper portions are formed by bending portions of the gasket holder.

By this constitution, the stopper portions can be formed by only bending portions of the gasket holder and the stopper portions are firmly stopped by the stopper holes of the attachable and detachable block whereby the gasket holder is firmly stopped.

According to a fifth aspect of the present invention, there is provided the gasket holder according to the first aspect wherein a plurality of stopper holes are provided to the attachable and detachable block to interpose the first hole and a plurality of the stopper portions are provided to interpose the second hole at positions opposed to the stopper holes. By this constitution, positional shift and detachment of the holder can firmly be prevented. According to an eighth aspect of the present invention, there is provided the gasket holder wherein the plurality of stopper portions are disposed on a straight line, there is no vacancy on the straight line and when forces for stopping are exerted on the stopper portions, the gasket holder is not deformed.

Thereby, the gasket holder is not deformed when the gasket holder is mounted to the stopper holes of the attachable and detachable block and accordingly, the gasket can firmly be held and positioning accuracy can accurately be maintained.

According to an eleventh aspect of the present invention, there is provided the gasket holder according to the first aspect wherein in a gas supply device having a first opening and closing valve and a second opening and closing valve installed on a transfer pipe of a supply gas for cutting a flow of the supply gas, a flow rate control valve installed at an intermediary of the first and the second opening and closing valves for controlling a flow rate of the supply gas, replacement gas supplying means for supplying a replacement gas to the flow rate control valve, exhausting means for reducing a pressure of the supply gas in the flow rate control valve, a first base block where the first opening and closing valve, the replacement gas supplying means and the exhausting means are mounted, a second base block where the second opening and closing valve is mounted and a remaining gas replacing device for replacing the supply gas remaining in the flow rate control valve by the replacement gas, when the flow rate control valve is fastened by screws from above to the first base block and the second base block, two of the gasket holders are used respectively between the flow rate control valve and the first base block and between the flow rate control valve and the second base block and recesses are formed at the gasket holding portions of each of the two gasket holders.

According to this constitution, when the gasket holder of the present invention is used in the gas supply device, if the flow rate control valve is attached to or detached from the gas supply device, the flow rate control valve can easily be removed only by disengaging screws upwardly in respect of the unit and further, when a new one of the flow rate control valve is attached thereto, new ones of the gaskets used between the first and the second base blocks and the flow rate control valve, are held by being pinched at openings of the gasket holding portions of the gasket holders. In this case, the gasket holder is provided with elasticity whereby the gasket is firmly held. Further, the very small recesses are formed at predetermined positions of the gasket holder for pinching the gasket and accordingly, the gasket is positioned accurately at a predetermined position in respect of the gasket holder.

The gasket holder is stopped at the stopper holes formed in the flow rate control valve block by the stopper portions and is accurately positioned. Thereby, also the gasket is accurately positioned.

Next, the gasket is fastened by screws from above in a state where it is held by the gasket holder and therefore, the gasket is not horizontally shifted and accordingly, the gasket can uniformly be crushed. In this case, the pipe of the gasket is crushed by the blocks whereby the sealing at the surrounding of the hole is conducted. The coil spring is mounted to the inside thereof and therefore, the pipe is always brought into close contact with the blocks whereby an excellent sealing state is maintained.

BRIEF DESCRIPTION OF THE DRAWINGS

FIGS. 10(a) and 10(b) are sectional views taken on lines x(a)—x(a) and x(b)—x(b) at FIG. 9 showing a state of use of the gasket holder according to the embodiment of the present invention;

FIGS. 14A and 14B illustrate a plan view and a sectional view showing a state of use of the gasket holder according to the third embodiment of the present invention;

FIG. 16 is an exploded perspective view showing a state of use of a conventional gasket holder.

DETAILED DESCRIPTION OF THE PREFERRED EMBODIMENTS

An explanation will be given of a gasket holder according to an embodiment implementing the present invention in reference to the drawings as follows.

Figure 1:
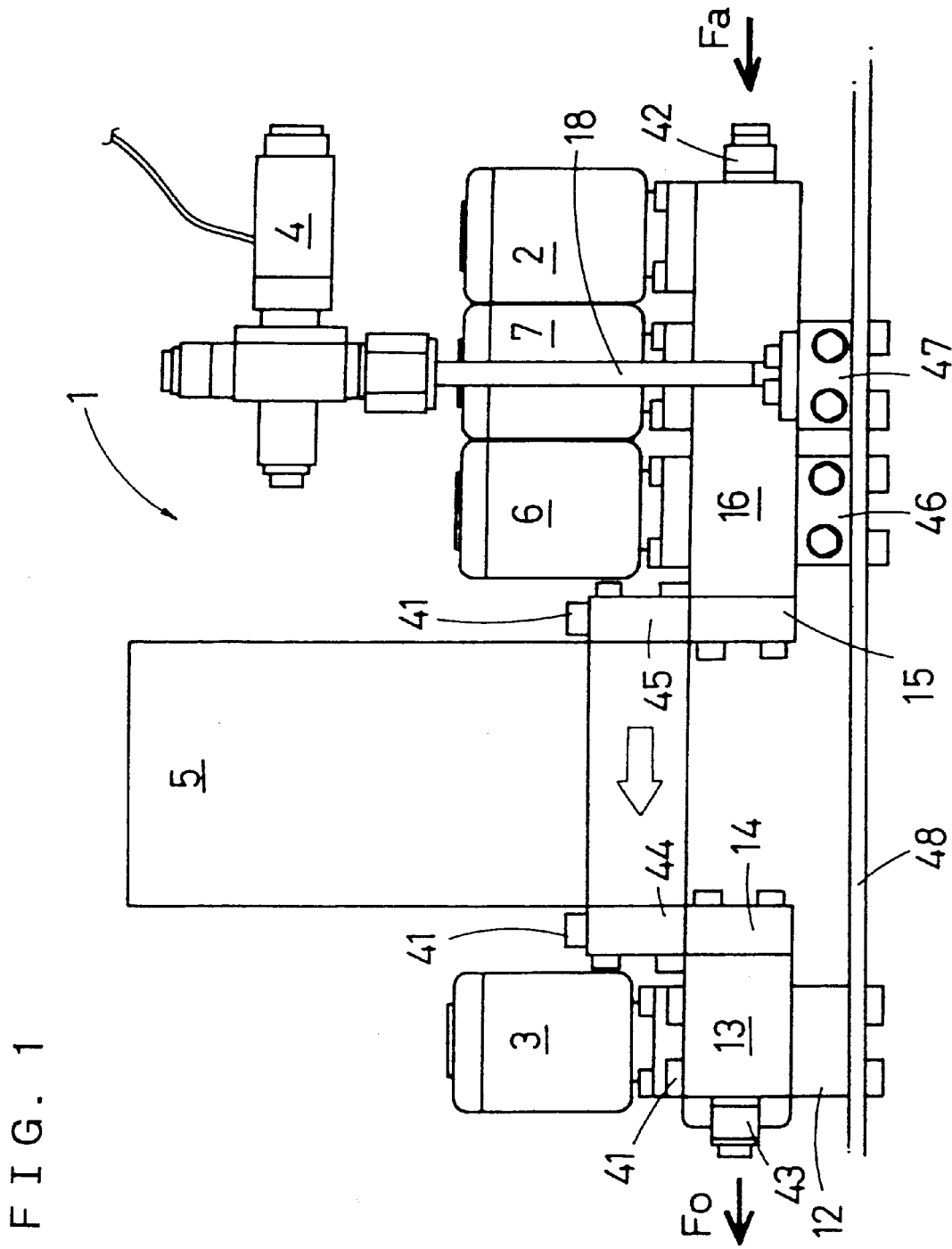
FIG. 1 is a side view showing the specific constitution of a gas supply device where a gasket holder according to an embodiment of the present invention is used.
Figure 2:
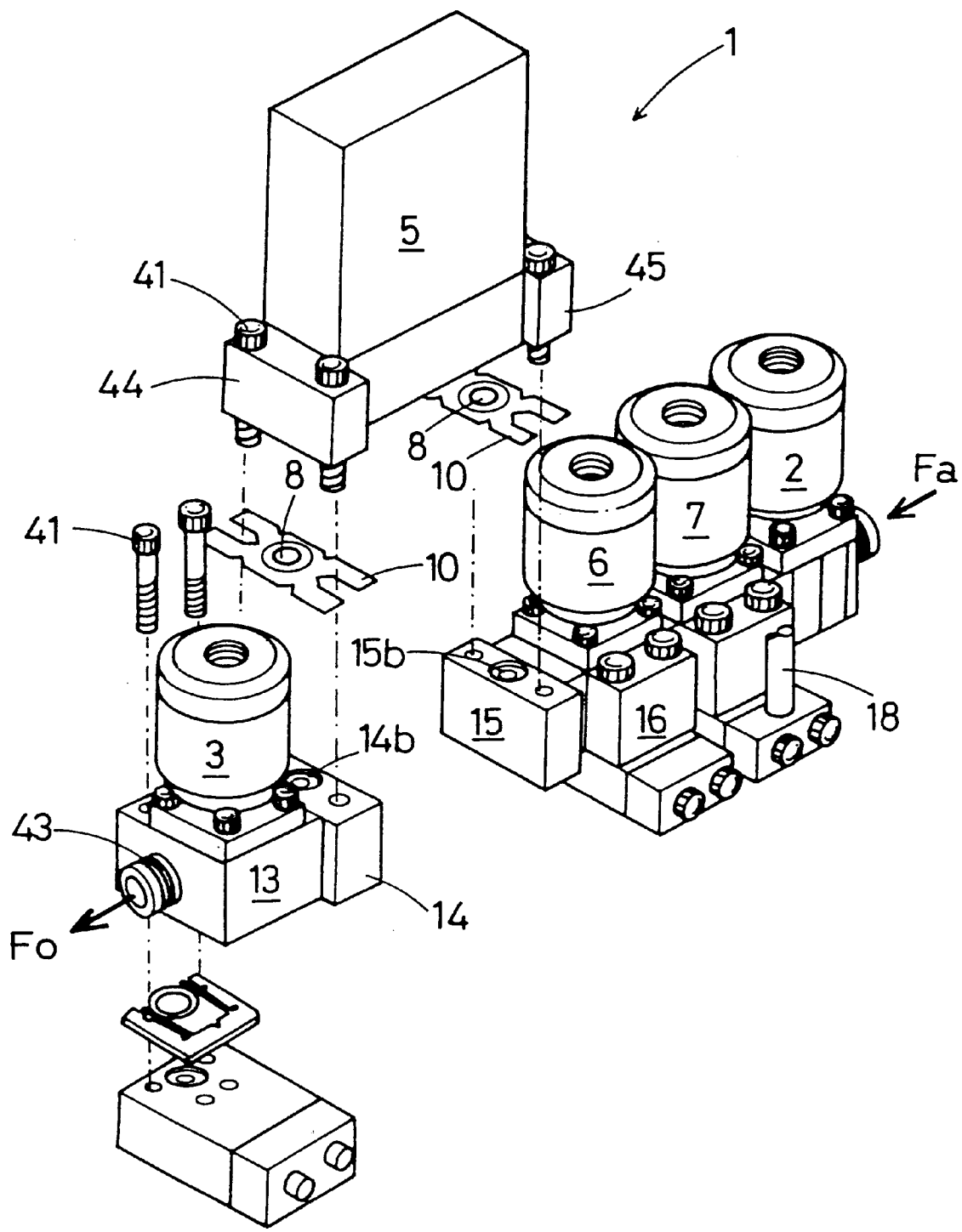
FIG. 2 is an exploded perspective view showing the specific constitution of the gas supply device where the gasket holder according to the embodiment of the present invention is used.
Figure 3:
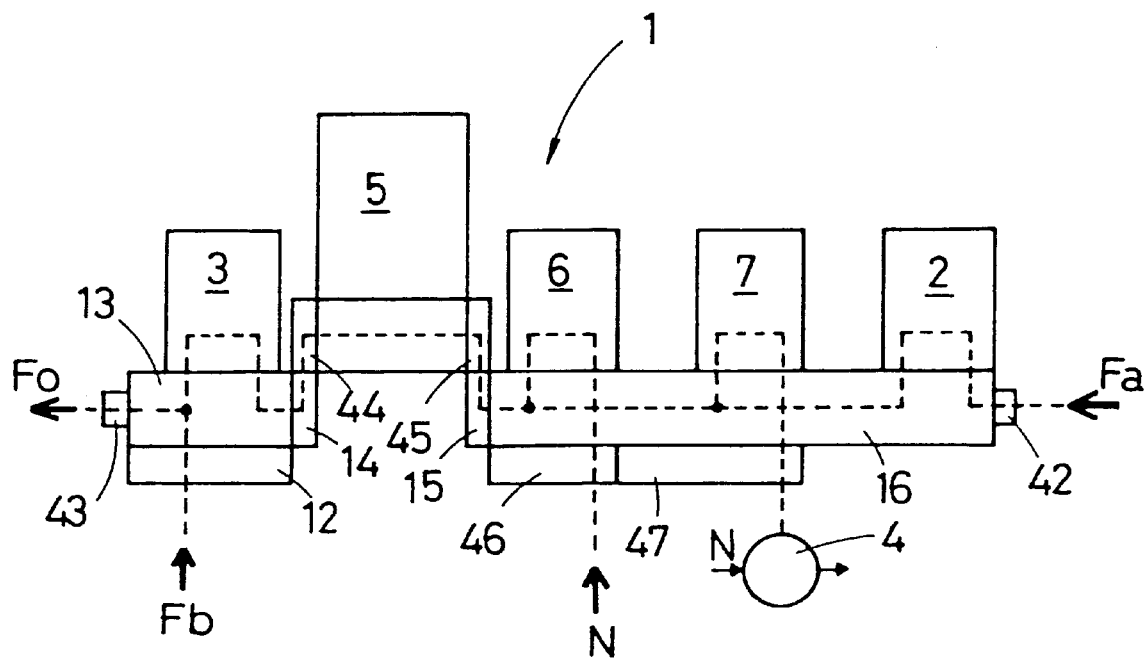
FIG. 3 is an explanatory view showing gas flow of the gas supply device where the gasket holder according to the embodiment of the present invention is used.

The gasket holder according to the embodiment of the present invention is used in a gas supply device for supplying a corrosive gas used in an etching step of photoresist fabrication. An explanation will firstly be given of the constitution of a gas supply device where the gasket holder according to the embodiment is used in reference to the drawings. FIG. 1 is a side view of a gas supply device and FIG. 2 is an exploded perspective view of the gas supply device. Further, FIG. 3 is an explanatory view showing flow of a supply gas Fa in the gas supply device.

As shown by FIG. 1 and FIG. 2, a flow rate control valve 5 is attachably and detachably installed on the left side of the central portion of a gas supply device 1. Flow rate control valve blocks 44 and 45 for changing directions of flow paths of gas and for screwing from above to direction change blocks 14 and 15, mentioned later, are fastened to the left side and the right side of the flow rate control valve 5 horizontally by screws.

Under the flow rate control valve block 44, the direction change block 14 for changing a direction of a flow path is screwed to an output valve block 13 from right. An output valve 3 is screwed from above to the output valve block 13. Further, an output joint 43 is attached from left to the output valve block 13 and the output valve block 13 is fastened by two screws 41 from above to an output manifold 12 that is screwed from below to a base plate 48.

Under the flow rate control valve block 45, the direction change block 15 for changing a direction of a flow path is screwed from left to an input valve block 16. A purge valve 6, an ejector valve 7 and an input valve 2 are respectively screwed from above to the input valve block 16. Further, an input joint 42 is attached from right to the input valve block 16. The input valve block 16 is fastened to a purge manifold 46 and an ejector manifold 47 both screwed from below to the base plate 48 from above respectively by two screws. An ejector 4 is connected to one end of the ejector manifold 47 via an ejector pipe 18. One end of the purge manifold 46 is connected to a nitrogen gas tank, not illustrated, storing nitrogen gas that is an inert gas.

Next, an explanation will be given of flow paths of gases of the gas supply device 1 in reference to FIG. 3. The corrosive gas Fa is made to flow in the gas supply device 1 from the input joint 42, pass through a hole at the inside of the input valve block 16 and is connected to an input port of the input valve 2. An output port of the input valve 2 is connected to an input port of the flow rate control valve 5 via a hole at the inside of the input block 16 while the direction of flow is changed by the direction change block 15 and the flow rate control valve block 45. The output port of the input valve 2 is also connected to an input port of the ejector valve 7 and an output port of the purge valve 6 via the hole at the inside of the input block 16.

An output port of the flow rate control valve 5 is connected to an input port of the output valve 3 via a hole perforated at the inside of the output valve block 13 while the direction of flow is changed by the flow rate control valve block 44 and the direction change block 14. An output port of the output valve 3 is connected to the output joint 43 via a hole installed at the inside of the output valve block 13. Further, the output joint 43 is connected to an output port of other output valve supplying a supply gas Fb by the output manifold 12 via a hole perforated at the inside of the output valve block 13. Thereby, an arbitrary mixed gas Fo can be supplied by mixing two or more of supply gases. The output joint 43 is connected to an etching device in semiconductor manufacturing steps, not shown.

Next, an explanation will be given of a gasket retainer 10 which is an embodiment of a gasket holder according to the present invention in reference to FIG. 2, FIG. 4 through FIG. 12.

As shown by FIG. 2, the gasket retainers 10 holding gaskets 8 are attached respectively between the flow rate control valve block 44 and the direction change block 14, and between the flow rate control valve block 45 and the direction change block 15.

Figure 4:
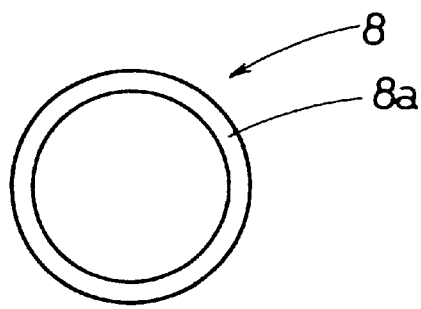
FIG. 4 is a plan view of a gasket held by the gasket holder according to the embodiment of the present invention.
Figure 5:
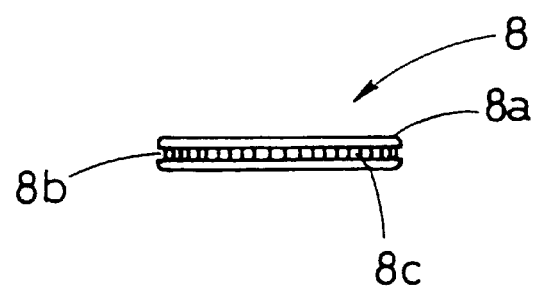
FIG. 5 is a side view of the gasket held by the gasket holder according to the embodiment of the present invention.

The structure of the gasket 8 is shown in FIG. 4 and FIG. 5. FIG. 4 is a plan view of the gasket 8 and FIG. 5 is a side view of the gasket 8. The gasket 8 is of annular shape and formed by an outer circular sheath 8a having an outside circumferential opening or slot 8b to establish a C-shaped radial cross-section in the sheath. A circumferential coil spring core 8c is contained within the sheath 8a pipe 8a where one side face thereof is opened. Here, an opening 8b is positioned at the outer periphery thereof. A spring 8c wound in a coil is mounted in the pipe 8a.

In this case, the gasket 8 is crushed when it is used once and the gas tight performance thereof is deteriorated and therefore, it cannot be reused. Therefore, when the flow rate control valve 5 is exchanged, a new one of the gasket 8 must be used.

Figure 6:
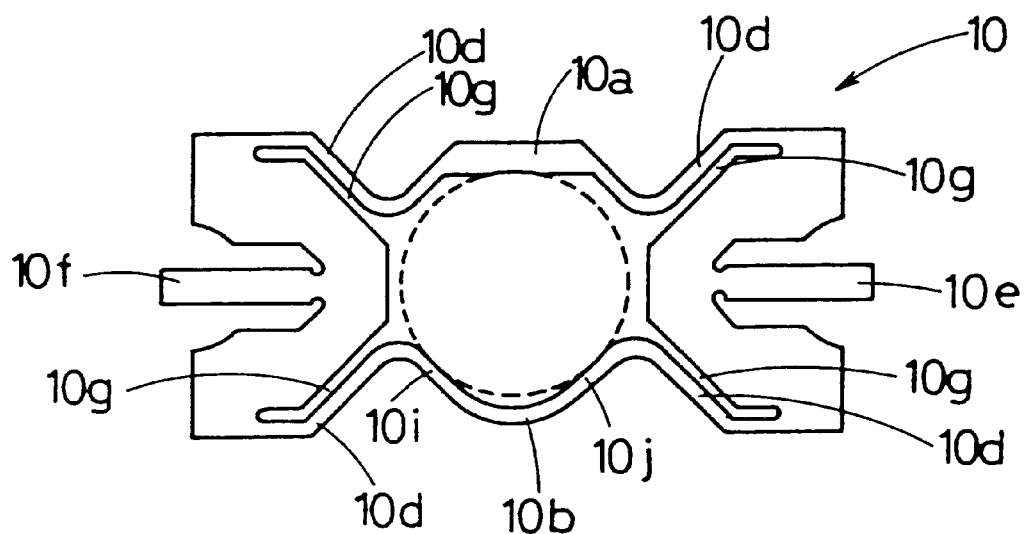
FIG. 6 is a plan view of the gasket holder according to the embodiment of the present invention.

Next, an explanation will be given of the structure of the gasket retainer 10. The gasket retainer 10 shown by FIG. 6 is in a state fabricated by etching a plate material having a thickness of 0.3 mm.

Figure 7:
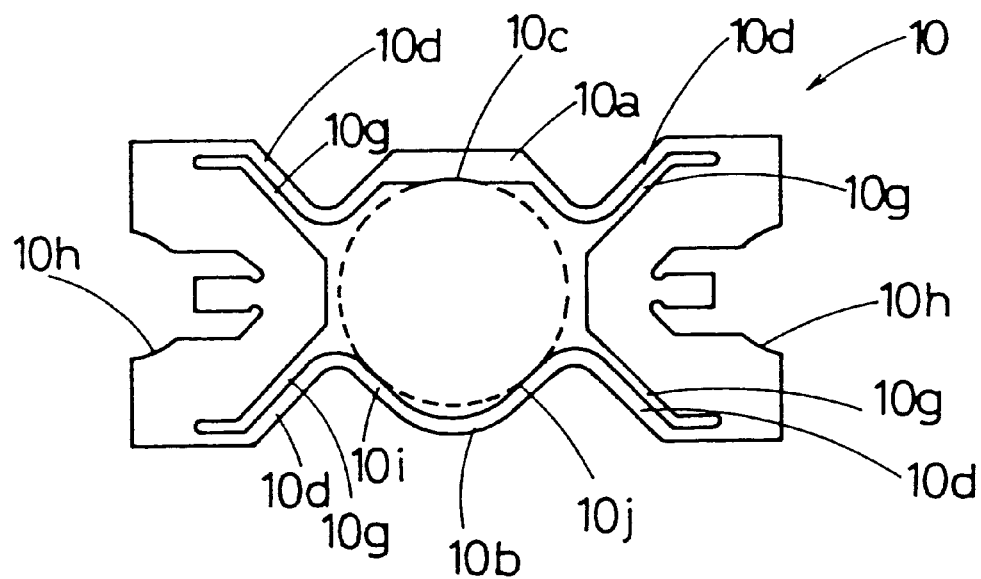
FIG. 7 is a plan view of the gasket holder according to the embodiment of the present invention.
Figure 8:
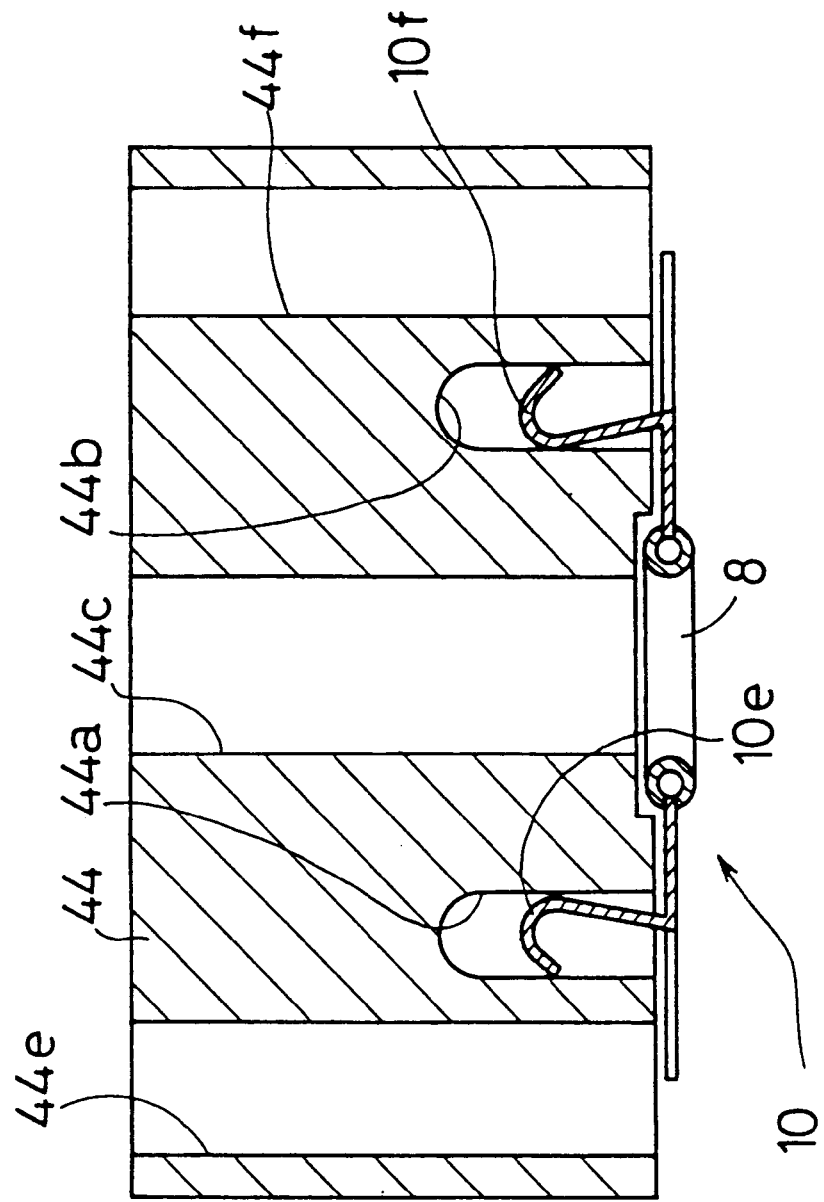
FIG. 8 is a sectional view showing a state of use of the gasket holder according to the embodiment of the present invention.

A couple of bending portions 10e and 10f are formed in the gasket retainer 10 and the bending portions are used by being bent as illustrated by FIG. 7 and FIG. 8. Here, FIG. 7 is a plan view showing a state of bending the bending portions 10e and 10f of the gasket retainer 10 and FIG. 8 is a sectional view showing a state where the bending portions 10e and 10f are engaged with stopper holes 44a and 44b installed to the flow rate control valve block 44. Incidentally, the bending portions 10e and 10f constitute stopper portions in the present invention.

Next, a detailed explanation will be given of the structure of the gasket retainer 10 in reference to FIG. 6 and FIG. 7. A first gasket holding portion 10a formed in a straight line and a second gasket holding portion 10b formed in a curved line are provided to the gasket retainer 10. The first gasket holding portion 10a and the second gasket holding portion 10b are formed in leaf springs and are provided with constant elasticity. A recess 10c for engaging with the gasket 8 is formed at the first gasket holding portion 10a. The first gasket holding portion 10a is held by arms 10d which are formed in slender leaf springs at the left and right in respect of the first gasket holding portion 10a. Slits 10g are respectively formed at the insides of the arms 10d. The second gasket holding portion 10b is also held by arms 10d at the left and right thereof and slits 10g are respectively formed at the insides of the arms 10d. Further, escape portions 10h of the attaching screws 41 are respectively formed at the left and right ends of the gasket retainer 10.

Figure 9:
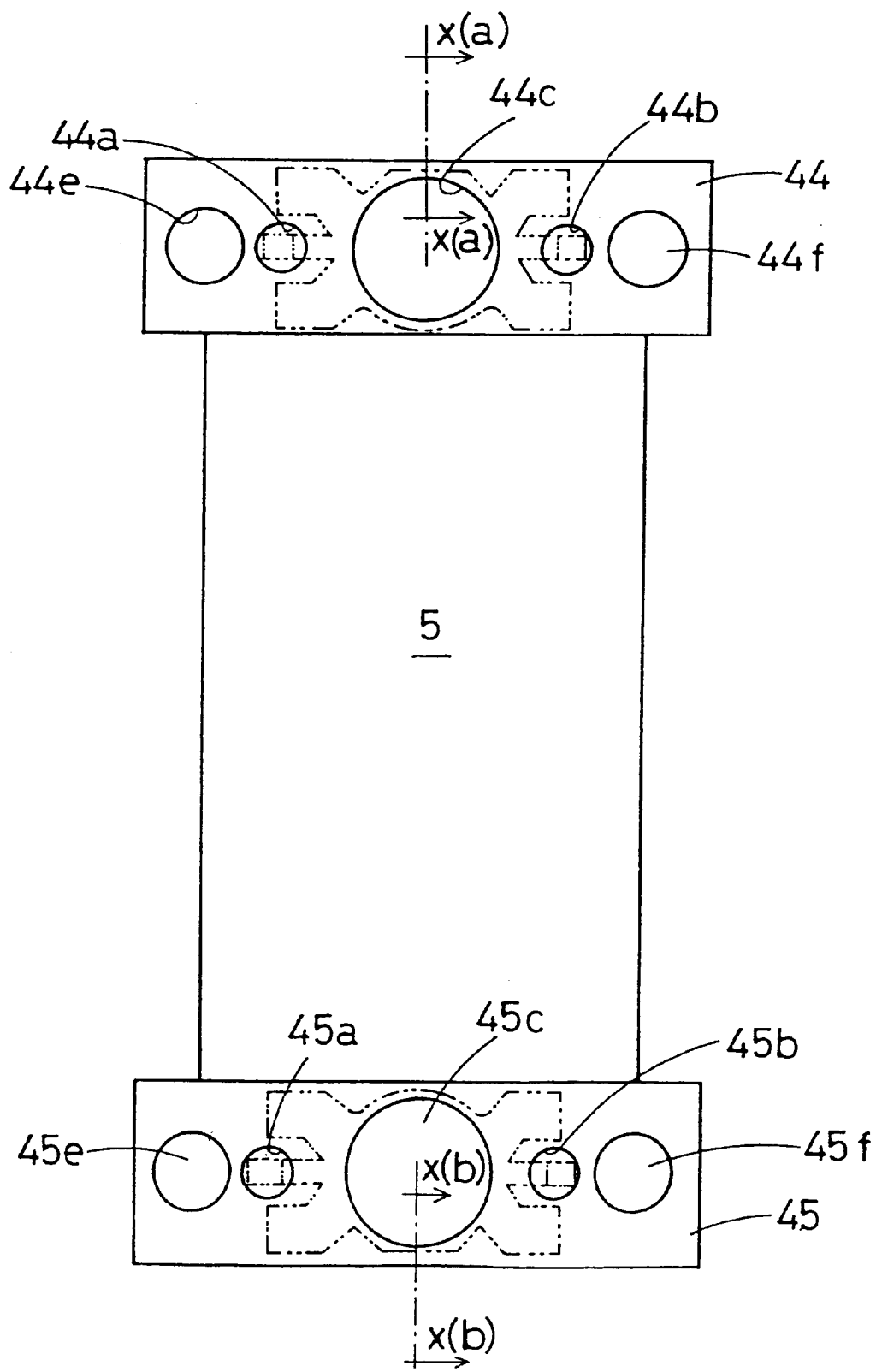
FIG. 9 is a bottom view of a flow rate control valve and flow rate control valve blocks where the gasket holder according to the embodiment of the present invention is used.

In this embodiment, the gasket 8 is held by the gasket retainer 10 by pinching the opening 8b by the first gasket holding portion 10a and the second gasket holding portion 10b in leaf springs of the gasket retainer 10. In that case the gasket 8 is supported by a total of three points of the recess 10c of the first gasket holding portion 10a and recesses 10i and 10j of the second gasket holding portion 10b. Accordingly, the gasket 8 is accurately positioned in respect of the gasket retainer 10 and the gasket 8 can be prevented from detaching from the gasket retainer 10. FIG. 9 is a bottom view of the flow rate control valve 5 and the flow rate control valve blocks 44 and 45. Seat recesses 44c and 45c for seating the gasket 8 are respectively formed at the bottom faces of the flow rate control valve blocks 44 and 45. Further, the stopper holes 44a and 44b are provided to the bottom face of the flow rate control valve block 44 at positions opposed to each other via the seat recess 44c and through holes 44e and 44f for passing through the screws 41 are respectively formed at the outer sides of the stopper holes 44a and 44b. Further, stopper holes 45a and 45b are provided to the bottom face of the flow rate control valve block 45 at positions opposed to each other via the seat recess 45c and through holes 45e and 45f for passing through the screws 41 are respectively formed at the outer sides of the stopper holes 45a and 45b.

Next, an explanation will be given of the operation of the gasket retainer 10 according to the first embodiment.

In attaching the flow rate control valve 5 to the gas supply device 1, the opening 8b of the gasket 8 is held by three point support by the recess 10c of the first gasket holding portion 10a and the recesses 10i and 10j of the second gasket holding portion 10b in the gasket retainer 10. In this case, the first gasket holding portion 10a, the second gasket holding portion 10b and the respective arms 10d are formed in leaf springs and therefore, they are provided with elasticity whereby the gasket 8 can firmly be held. Next, the couple of bending portions 10e and 10f of the gasket retainer 10 holding the gasket 8, are bent by raising them and are inserted into the stopper holes 44a and 44b of the flow rate valve block 44 as illustrated by FIG. 8. Then, the bending portions 10e and 10f are provided with elasticity and are wider than at the insides of the stopper holes 44a and 44b and thus held by inner side walls of the stopper holes 44a and 44b. Accordingly, the gasket retainer 10 is held by the flow rate control valve block 44 on the side of the flow rate control valve 5 and therefore, the gasket retainer 10 is not detached therefrom in attaching and exchanging the flow rate control valve 5. The gasket 8 and the gasket retainer 10 can be handled integrally with the flow rate control valve 5 and therefore, the gasket 8 and the gasket retainer 10 can be arranged easily at correct positions even in a narrow space where the flow rate control valve 5 is attached.

Incidentally, the gasket 8 and the gasket retainer 10 are similarly arranged also between the flow rate control valve block 45 and the direction change block 15. Thereby, the gaskets 8 are correctly positioned to gas holes 14b and 15b of the direction change blocks 14 and 15.

FIG. 10 is a sectional view showing a state where the gasket 8 and the gasket retainer 10 are attached between the direction change block 14 and the flow rate control valve block 44. The thickness of the gasket 8 is 1.6 mm. The seat recess 14c and a seat recess 44c each having the depth of 0.5 mm for use of the gasket 8 are formed at the direction change block 14 and the flow rate control valve block 44. The thickness of the gasket retainer 10 is 0.3 mm and the gasket 8 is crushed by 0.3 mm by fastening the crews 41 in this state.

At this occasion, there are plays between the gasket 8 and the seat recesses 14c and 44c, however, the gasket 8 is held by the gasket retainer 10 and therefore, the flow rate control valve 5 can be attached without horizontally shifting the gasket 8 whereby the gas tight performance of the gasket 8 is promoted. Also, the gasket 8 is uniformly compressed and therefore, complete sealing can be conducted and there is no concern of leaking the corrosive gas Fa.

Further, the gasket 8 is similarly crushed between the direction change block 15 and the flow rate control valve block 45 thereby achieving the sealing function.

Next, an explanation will be given of a gasket retainer 20 showing a second embodiment of the present invention in reference to FIG. 11 and FIG. 12.

Figure 11:
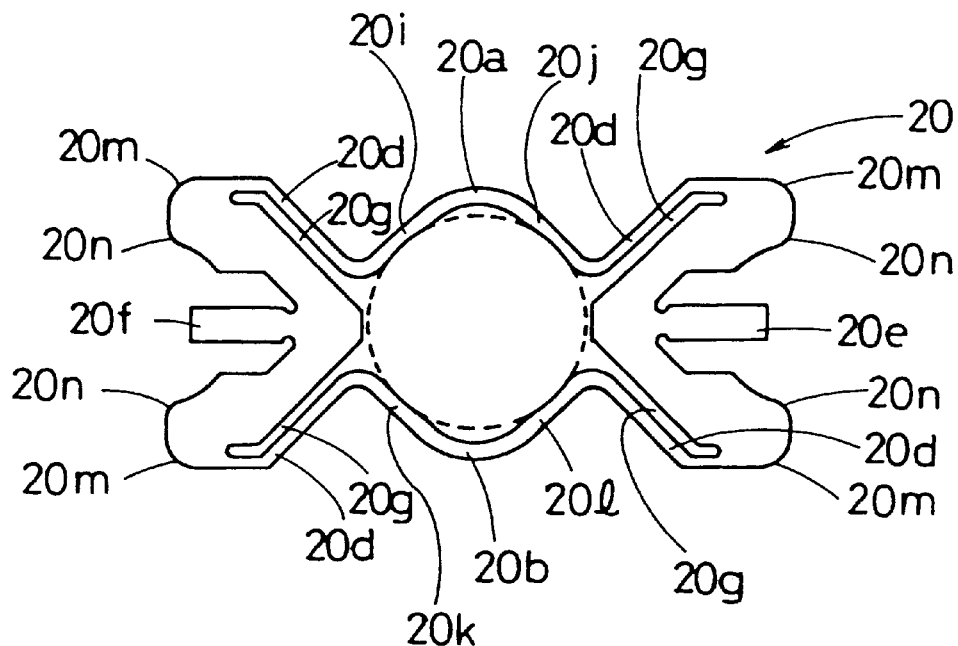
FIG. 11 is a plan view of a gasket holder according to a second embodiment of the present invention.

FIG. 11 shows the gasket retainer 20 fabricated by etching a plate material having the thickness of 0.3 mm. According to the gasket retainer 20, a couple of bending portions 20e and 20f are formed and are used by being bent in using the gasket retainer 20 as shown by FIG. 12 similar to the gasket retainer 10. FIG. 12 is a plan view showing a state where the couple of bending portions 20e and 20f of the gasket retainer 20 are bent. The bending portions 20e and 20f are respectively engaged with the stopper holes 44a, 44b, 45a and 45b provided at the flow rate control valve blocks 44 and 45. Incidentally, the bending portions 20e and 20f constitute stopper portions of the present invention.

Next, a detailed explanation will be given of the structure of the gasket retainer 20 in reference to FIG. 11 and FIG. 12. A first gasket holding portion 20a and a second gasket holding portion 20b both formed in curved lines are provided to the gasket retainer 20. The first gasket holding portion 20a and the second gasket holding portion 20b are formed in leaf springs and provided with constant elasticity. Further, recesses 20i and 20j are formed in the first gasket holding portion 20a. The first gasket holding portion 20a is held by arms 20d which are formed in slender leaf springs at the left and right portions thereof. Slits 20g are respectively formed at insides of the arms 20d. Recesses 20k and 20l are also formed at the second gasket holding portion 20b. The second gasket holding portion 20b is held by the arms 20d at left and right portions thereof. Slits 20g are respectively formed at insides of the arms 20d. Escaping portions 20h for the attaching screws 41 are formed respectively at left and right ends of the gasket retainer 20.

In this case, the opening portion 8b of the gasket 8 is held by the gasket retainer 20 by being pinched by the first gasket holding portion 20a and the second gasket holding portion 20b in leaf springs of the gasket retainer 20. At this occasion, the gasket 8 is supported by a total of four points, that is, the recesses 20i and 20j of the first gasket holding portion 20a and the recesses 20k and 20l second gasket holding portion 20b. Accordingly, the gasket 8 can be positioned accurately to the gasket retainer 20 and the gasket 8 can be prevented from detaching from the gasket retainer 20.

Figure 12:
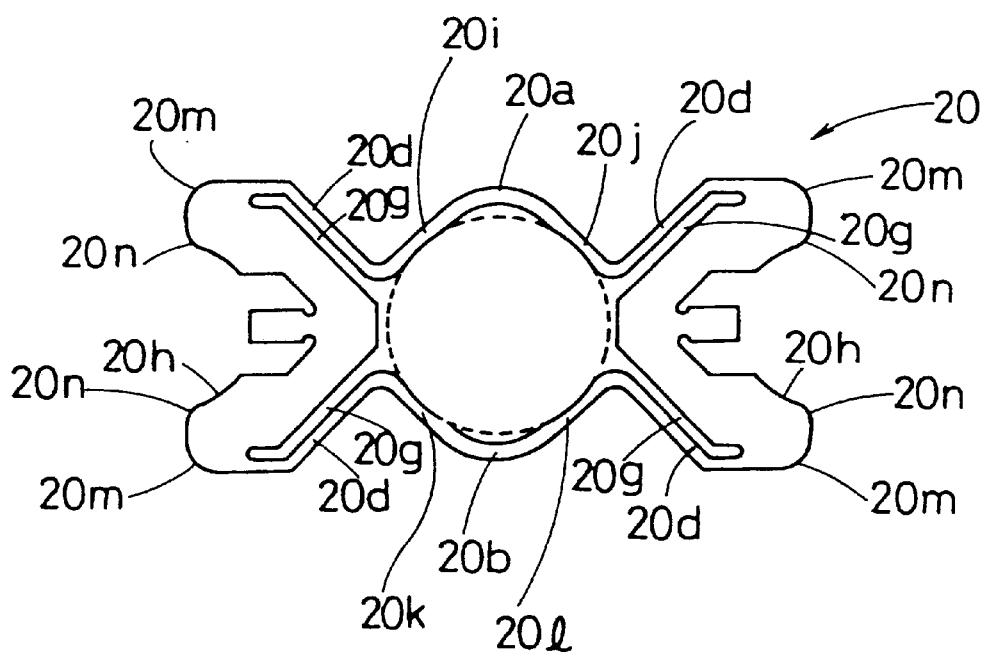
FIG. 12 is a plan view of the gasket holder according to the second embodiment of the present invention.

As shown by FIG. 11 and FIG. 12, according to the gasket retainer 20 of the second embodiment, corners 20m on the outer sides of the left and right ends of the main body of the gasket retainer 20, are rounded and corners 20n on the inner sides are respectively rounded. Therefore, gloves or the like are not caught by the corners 20m and 20n whereby integrating operation can be carried out safely and efficiently.

As has been explained in detail, according to the first embodiment, when the flow rate control valve 5 is attached to and detached from the gas supply device 1 from above, the bending portions 10e and 10f of the gasket retainer 10 are respectively stopped and held by the stopper holes 44a, 44b, 45a and 45b of the flow rate control valve blocks 44 and 45 and therefore, in integrating and exchanging the gaskets 8 and the gasket retainers 10, the gaskets 8 and the gasket retainers 10 can be handled integrally with the flow rate control valve 5 and therefore, exchange of the gaskets 8 and the gasket retainers 10 is facilitated even in a narrow attaching space. Further, the gasket 8 is held by the gasket retainer 10 by three point support and accordingly, the gasket 8 can be positioned accurately and further, the gasket 8 is not detached from the gasket retainer 10.

Further, according to the gasket retainer 20 of the second embodiment, the gasket 8 is held by four point support and therefore, the gasket 8 can be positioned more accurately and the gasket 8 is not detached from the gasket retainer 20.

Moreover, the corners 20m and 20n of the gasket retainer 20 are rounded and therefore, in attaching and detaching the gasket retainer 20, gloves or the like are not caught thereby and the operation can be performed safely and efficiently.

Figure 13:
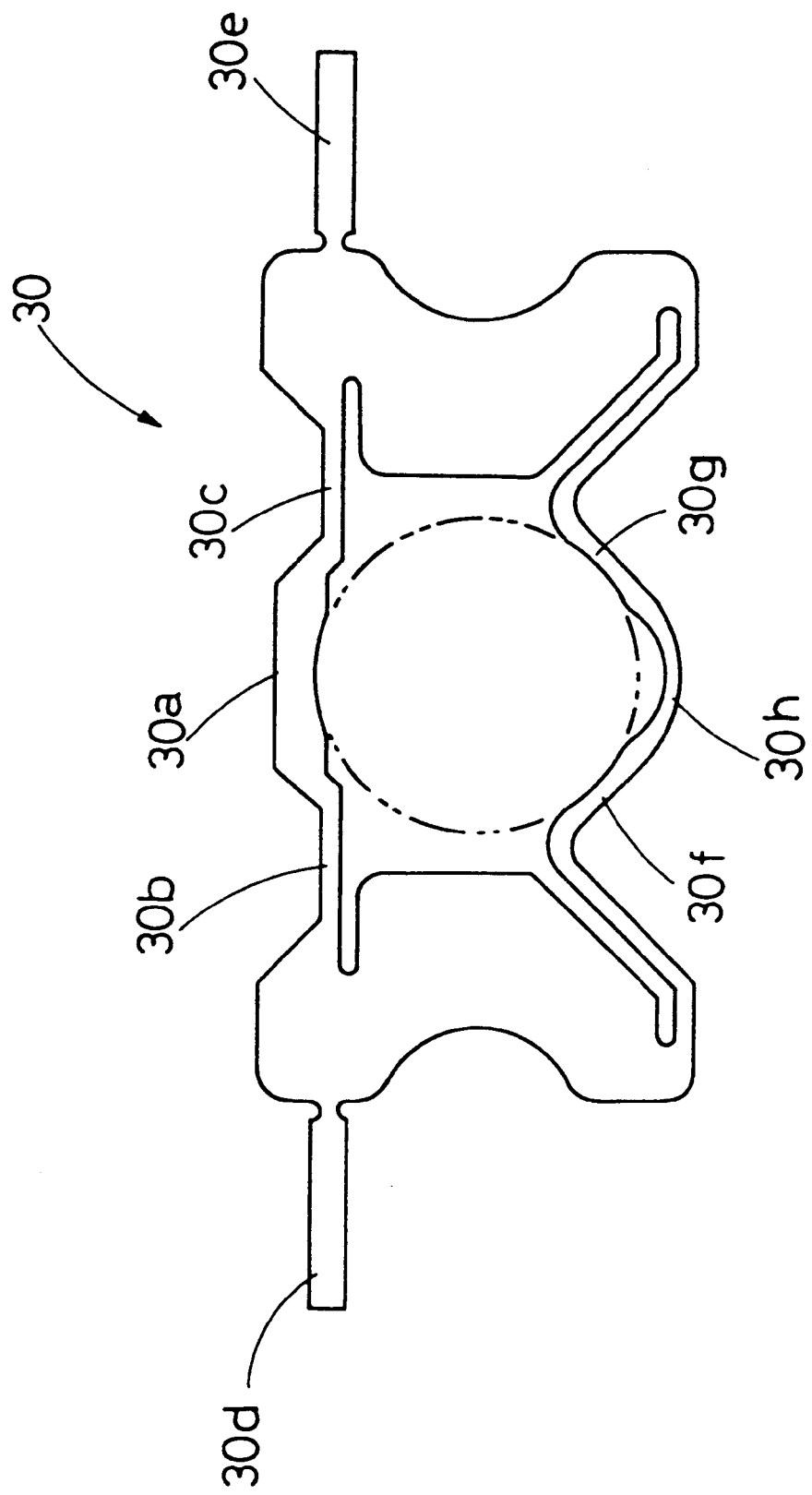
FIG. 13 is a plan view of a gasket holder according to a third embodiment of the present invention.

Next, an explanation will be given of a gasket retainer 30 showing a third embodiment of the present invention. FIG. 13 is a plan view of the gasket retainer 30. The feature of the third embodiment resides in that a couple of bending portions 30d and 30e are formed at the upper portion thereof and aligned on a straight line along with a first gasket holding portion 30a due to a couple of linear arms 30b and 30c along with the bending portions.

A couple of recesses 30f and 30g are formed at a second gasket holding portions 30h and the gasket 8 is held by a total of three points, that is, one point of the first gasket holding portion 30a and two points of the couple of recesses 30f and 30g.

Figure 15:
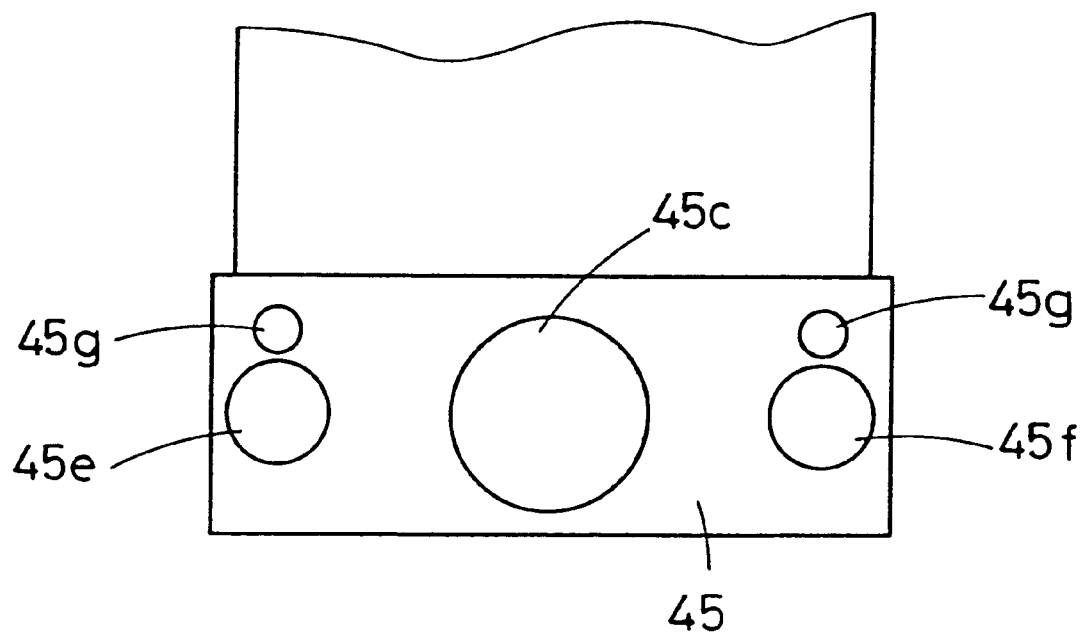
FIG. 15 is a bottom view of a flow rate control valve and flow rate control valve blocks where the gasket holder according to the third embodiment of the present invention is used.

FIG. 15 is a bottom view of the flow rate control valve block 45. Incidentally, the flow rate control valve block 44 is also provided with the similar constitution and therefore, an explanation will be given only of the flow rate control valve block 45. A seat recess 45c for use of the gasket 8 is formed at the bottom face of the flow rate control valve block 45. A couple of stopper holes 45g are provided on the bottom face of the flow rate control valve block 45 at positions opposed to each other at upper portions on the both sides of the seat recess 45c and through holes 45e and 45f for passing through the screws 41 are respectively formed on the lower sides of the couple of stopper holes 45g.

Next, an explanation will be given of the operation of the third embodiment.

In attaching the flow rate control valve 5 to the gas supply device 1, the opening 8b of the gasket 8 is held by three point support by the first gasket holding portion 30a and the couple of recesses 30f and 30g of the second gasket holding portion 30h of the gasket retainer 30. In this case, the second gasket holding portion 30h is formed in a leaf spring and accordingly, the second gasket holding portion 30h is provided with elasticity whereby the gasket 8 can firmly be held.

Next, the couple of bending portions 30d and 30e of the gasket retainer 30 holding the gasket 8, are respectively bent by being raised as shown by FIGS. 14A and 14B and are inserted into the couple of stopper holes 45g of the flow rate control valve block 45. Then, the bending portions 30d and 30e are provided with elasticity and therefore, they are wider than the couple of stopper holes 45g. Therefore, the bending portions 30 d and 30e are held by friction with inner side walls of the stopper holes 45g.

In this embodiment, the couple of bending portions 30d and 30e are on a straight line and there is no discontinuity of gasket retainer material on the straight line. Therefore, when a force for stopping the couple of bending portions 30d and 30e is exerted, the gasket retainer 30 is not deformed.

In this way, when the gasket retainer 30 is mounted to the couple of stopper holes 45g, the gasket retainer 30 is not deformed and accordingly, the gasket 8 can be held firmly and positioning accuracy can be maintained accurately.

Accordingly, the gasket retainer 30 is held by the flow rate control valve blocks 45 on the side of the flow rate control valve 5 and therefore, the gasket retainer 30 is not detached therefrom in attaching and exchanging the flow rate control valve 5. Also, the gasket 8 and the gasket retainer 30 can be handled integrally with the flow rate control valve 5 and therefore, the gasket 8 and the gasket retainer 30 can easily be arranged at correct positions even in a narrow space where the flow rate control valve 5 is attached.

Although the gasket 8 is held by three point support and four point support in the above-described embodiments, the gasket 8 may be supported by a plurality of points such as five points, six points, eight points or the like.

Additionally, although the gasket 8 is a C ring in the embodiments, an O ring may be used.

As is apparent from the above explanation, according to the gasket holder in the first aspect of the present invention, the gasket is held by the gasket holding portions of the gasket holder and the gasket holder is stopped by the attachable and detachable block by the stopper portions whereby the gasket holding portion is prevented from being detached from the attachable and detachable block. Therefore, the gasket and the gasket holder are integral with the attachable and detachable block whereby attaching and exchanging of the gasket and the gasket holder are facilitated.

According to the gasket holder of the second aspect of the present invention, the gasket is constituted to be held by three point support or four point support and therefore, the gasket is firmly held by the gasket holding portions whereby the gasket is accurately positioned and difficult to detach from the gasket holder.

According to the gasket holder of the third aspect of the present invention, the stopper portions can be formed only by bending portions of the gasket holder and the stopper portions are firmly stopped by the stopper holes of the attachable and detachable block whereby the gasket holder can firmly be stopped by the attachable and detachable block.

According to the gasket holder of the fourth aspect of the present invention, the plurality of stopper portions are held by the plurality of stopper holes and therefore, positional shift and detachment of the holder can firmly be prevented.

According to the gasket holder of the fifth aspect of the present invention, when the gasket holder of the present invention is used in a gas supply device, in attaching and detaching the flow rate control valve to and from the gas supply device, the flow rate control valve can easily be disengaged only by detaching the screws in the upward direction and when a new one of the flow rate control valve is attached, new gaskets used between the first and the second base blocks and the flow rate control valve are held therebetween by being pinched at the openings by the gasket holding portions of the gasket holder. In this case, the gasket holder is provided with elasticity and firmly holds the gasket. Further, very small recesses are formed at predetermined positions of the gasket holder for pinching a gasket and therefore, the gasket can be held to the gasket holder accurately at predetermined positions.

Next, the gasket holder is stopped at the stopper holes formed in the flow rate control valve block by the stopper portions and is accurately positioned. Thereby, the gasket can also be positioned accurately.

When the flow rate control valve or the like is fastened for attachment from above, the flow rate control valve or the like can be attached without horizontally shifting the gasket. Therefore, the gas tight performance of the gasket is promoted. Additionally, the gasket is uniformly compressed and therefore, complete sealing can be conducted and there is no concern of leaking a corrosive gas.

What is claimed is:

1. A gasket holder for holding a sealing gasket between a base block having a first hole for passing a fluid and a removably attachable block mounted to the base block and having a second hole for passing the fluid when the removable attachable block is attached to the base block to position the second hole on the first hole, the gasket being of annular shape and including an outer sheath having an outside circumferential slot, said gasket holder comprising:

gasket holding portions for holding the gasket at a predetermined position by engaging the outside circumferential slot; and stopper portions engageable with the removably attachable block so that the gasket holder is retained by the removably attachable block upon removal thereof from the base block.

2. The gasket holder according to claim 1, wherein the gasket holding portion holds the gasket by one of three point support and four point support.

3. The gasket holder according to claim 1, including stopper holes in the removably attachable block for receiving the stopper portions and wherein the stopper portions are projected bent portions of the gasket holder.

4. The gasket holder according to claim 2, including stopper holes in the removably attachable block for receiving the stopper portions and wherein the stopper portions are projected bent portions of the gasket holder.

5. The gasket holder according to claim 1, including at least two stopper holes in the removably attachable block, one on each of opposite sides of the second hole and at least two of the stopper portions positioned to be aligned with the stopper holes.

6. The gasket holder according to claim 2, including at least two stopper holes in the removably attachable block, one on each of opposite sides of the second hole and at least two of the stopper portions positioned to be aligned with the stopper holes.

7. The gasket holder according to claim 3, including at least two stopper holes in the removably attachable block, one on each of opposite sides of the second hole and at least two of the stopper portions positioned to be aligned with the stopper holes.

8. The gasket holder according to claim 5, wherein the at least two stopper portions are on a straight line without discontinuity of gasket holder material, and, when the stopper portions are inserted into the stopper holes, the gasket holder is not deformed.

9. The gasket holder according to claim 6, wherein the at least two stopper portions are on a straight line without discontinuity of gasket holder material, and, when the stopper portions are inserted into the stopper holes, the gasket holder is not deformed.

10. The gasket holder according to claim 7, wherein the at least two stopper portions are on a straight line without discontinuity of gasket holder material, and, when the stopper portions are inserted into the stopper holes, the gasket holder is not deformed.

11. In a gas supply device having a first opening and closing valve and a second opening and closing valve installed on a transfer pipe of a supply gas for cutting a flow of the supply gas, a flow rate control valve installed between the first and the second opening and closing valves for controlling a flow rate of the supply gas, replacement gas supplying means for supplying a replacement gas to the flow rate control valve, exhausting means for reducing a pressure of the supply gas in the flow rate control valve, a first base block supporting the first opening and closing valve, the replacement gas supplying means, and the exhausting means, a second base block supporting the second opening and closing valve and a remaining gas replacing device for replacing the supply gas remaining in the flow rate control valve by the replacement gas, when the flow rate control valve is fastened by screws from above to the first base block and the second base block, two gasket holders, one between the flow rate control valve and the first base block and the other between the flow rate control valve and the second base block, each of the two gasket holders comprising:
a gasket holding portion for holding the gasket at a predetermined position by engaging the outside circumferential slot, and
stopper portions engageable with the removably attachable block so that the gasket holder is retained by the removably attachable block upon removal thereof from the base block.

12. The gasket holder according to claim 11, wherein the gasket holding portion holds the gasket by one of three point support and four point support.

13. The gasket holder according to claim 11, including stopper holes in the flow rate control valve for receiving the stopper portions and wherein the stopper portions are projecting bent portions of the gasket holder.

14. The gasket holder according to claim 11, including at least two stopper holes, one on each of opposite sides of a flow passage in the flow rate control valve and at least two of the stopper portions positioned to be aligned with the stopper holes.

* * * * *